K. E. A. GRANSTEDT.
BELT DRIVING.
APPLICATION FILED MAR. 1, 1920.

1,352,511.

Patented Sept. 14, 1920.

Inventor-
Karl Erik Albert Granstedt,
By B. Singer,
Atty.

UNITED STATES PATENT OFFICE.

KARL ERIK ALBERT GRANSTEDT, OF STOCKHOLM, SWEDEN, ASSIGNOR TO GALCO MASKINFABRIKS AKTIEBOLAG, OF STOCKHOLM, SWEDEN, A CORPORATION.

BELT-DRIVING.

1,352,511.  Specification of Letters Patent.  Patented Sept. 14, 1920.

Application filed March 1, 1920. Serial No. 362,638.

*To all whom it may concern:*

Be it known that I, KARL ERIK ALBERT GRANSTEDT, subject of the King of Sweden, residing at Stockholm, Sweden, have invented certain new and useful Improvements in Belt-Driving, of which the following is a specification.

The present invention relates to belt driving and particularly to such applied to overhead counter-shafting, and the invention principally consists in two pulleys being rotatably mounted on the same fixed shaft, by means of ball bearings or roller bearings, one of said pulleys being a loose pulley, while the other pulley is provided with two rims, one of which carries a driving belt running continually thereon, whereas the other rim is adapted to receive the driving belt from the loose pulley or vice versa.

Figure 1:
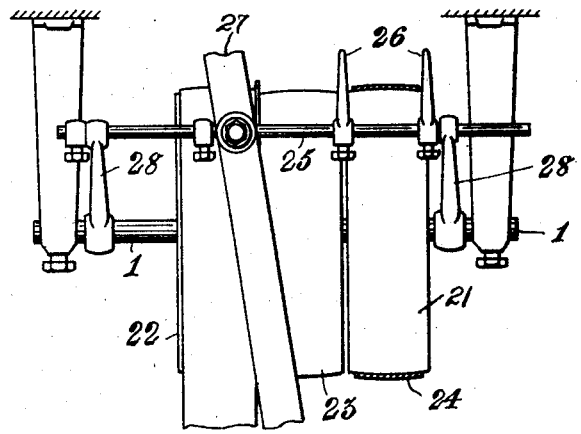
Figure 2:
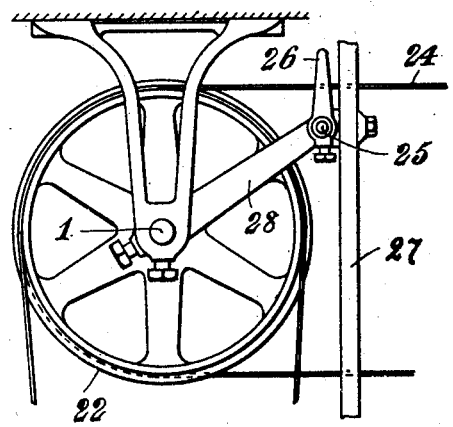

An embodiment of the invention is illustrated in the accompanying drawing, where it is shown in elevation in Figure 1 and in end view of Fig. 2.

Rotatably mounted on the fixed shaft 1 is a loose pulley 21 and a pulley provided with two rims, one of which 22 carries the belt running between the overhead-countershaft and the machine to be driven, while the other rim 23 is situated immediately beside the loose pulley in order to receive the driving belt 24 from the latter.

In transmissions of this type as heretofore known the power for the pulley to be driven is transmitted through the shaft carrying the transmitting elements, said pulley being rigidly fastened to the shaft, which is rotatably mounted, and either rigidly connected with a driving pulley receiving the driving belt from the loose pulley, or, if a plurality of loose pulleys are employed, the driving pulley is temporarily connected to one of the loose pulleys. Evidently, the shaft, in such case has to be carried by suitable bearings, and it must also be calculated both for strains of flexure and for torsional strains, in addition to which it requires careful machining because of its being used as a rotating machine part.

In such a transmission with two loose pulleys rotating in opposite directions an exceedingly great wear has to be reckoned with, because the shaft and the loose pulley mounted thereon, which at the moment is not connected to the shaft, rotate in opposite directions so that the relative angular velocity between said parts will be equal to the sum of their real angular velocities.

These drawbacks are entirely avoided in the arrangement according to the present invention.

On account of the fact that the shaft does not take part in the rotation, it only has to be calculated for strains of flexure, and, furthermore, the shaft may be given much smaller dimensions than if it were to rotate also because of the rigid mounting of same, whereby the resistance of the shaft to bending movements is rendered much greater than if it were resting loosely in the drop-hanger-frames. This is of particular importance with respect to the employment of ball bearings for the pulleys, in that comparatively small bearings only are required. The difference in cost between ball bearings of different sizes is known to be considerable, and as in the transmission systems heretofore used there are also required four ball bearings the same as in the embodiments of the present invention, the latter thus greatly reduces the costs for ball bearings, in addition to which the weight of the transmission is appreciably reduced.

The belt-shifter serving to shift the driving belt from the loose pulley to the rim 23 and vice versa, in known manner, includes a slidable rod 25 with two projections 26 arranged thereon on either side of the belt 24, the said projections being adapted to be angularly adjusted and secured to the rod 25. The rod 25 may be displaced by means of a lever 27 arranged in any convenient manner. The sliding rod 25 is carried by arms 28 adapted to be adjusted to and secured in any angular position on shaft 1. Thus, the belt-shifter may be easily adjusted according to the position of the driving belt by turning the arms 28.

What I claim as new and desire to secure by Letters Patent of the United States is:—

The combination of a fixed shaft, a single pulley loose on said shaft, a double pulley also loose in said shaft and arranged next the single pulley, a belt shiftable to enter the single pulley on the adjacent part of the double pulley, radial arms secured to said shaft, a slidable rod mounted in said arms and having projections to engage opposite sides of said shiftable belt, and a lever to move said rod and thereby shift said belt.

In testimony whereof I affix my signature in presence of two witnesses.

KARL ERIK ALBERT GRANSTEDT.

Witnesses:
HELGE ANDERSSON,
ELIN G. WAHMAN.